United States Patent
Chen et al.

(10) Patent No.: US 9,165,471 B1
(45) Date of Patent: Oct. 20, 2015

(54) SYSTEM AND METHOD FOR DETERMINING AIRCRAFT PAYLOADS TO ENHANCE PROFITABILITY

(71) Applicant: GENERAL ELECTRIC COMPANY, Schenectady, NY (US)

(72) Inventors: Weiwei Chen, New Brunswick, NJ (US); Srinivas Bollapragada, Niskayuna, NY (US); Jon David Petersen, Austin, TX (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/228,461

(22) Filed: Mar. 28, 2014

(51) Int. Cl.
G06G 7/70 (2006.01)
G06G 7/48 (2006.01)
G08G 5/00 (2006.01)
G06Q 10/06 (2012.01)

(52) U.S. Cl.
CPC .......... *G08G 5/0039* (2013.01); *G06Q 10/0631* (2013.01); *G08G 5/003* (2013.01); *G08G 5/0034* (2013.01)

(58) Field of Classification Search
CPC . G06Q 10/0631; G08G 5/0039; G08G 5/003; G08G 5/0034
See application file for complete search history.

(56) References Cited

U.S. PATENT DOCUMENTS

| | | | |
|---|---|---|---|
| 4,642,775 A * | 2/1987 | Cline et al. | 701/528 |
| 5,652,867 A | 7/1997 | Barlow et al. | |
| 6,804,658 B2 | 10/2004 | Lim et al. | |
| 7,110,960 B2 | 9/2006 | Phillips et al. | |
| 7,194,418 B2 | 3/2007 | Smith | |
| 8,321,252 B2 | 11/2012 | Gliozzi et al. | |
| 2003/0078719 A1* | 4/2003 | Zobell et al. | 701/120 |
| 2003/0225593 A1 | 12/2003 | Ternoey et al. | |
| 2004/0230472 A1 | 11/2004 | Venkat et al. | |
| 2008/0015926 A1 | 1/2008 | Marcken | |
| 2008/0059273 A1 | 3/2008 | Miller | |
| 2008/0133304 A1* | 6/2008 | Clarke et al. | 705/8 |
| 2009/0119135 A1* | 5/2009 | Schoeman et al. | 705/5 |
| 2011/0246176 A1* | 10/2011 | Arasada | 704/3 |
| 2011/0251781 A1* | 10/2011 | Brennan | 701/120 |
| 2012/0209662 A1 | 8/2012 | Kahn et al. | |
| 2012/0245834 A1* | 9/2012 | Klooster et al. | 701/120 |
| 2012/0310680 A1 | 12/2012 | Bourla | |

(Continued)

OTHER PUBLICATIONS

Bollapragada et al., "Practice Summary: Flight Trajectory Optimization," Dec. 6, 2013, pp. 547-549, vol. 43, Issue 6, Interfaces (pre-publication version provided).

(Continued)

*Primary Examiner* — Rodney Butler
(74) *Attorney, Agent, or Firm* — John P. Darling

(57) ABSTRACT

A method for managing aircraft operations includes determining, via a trajectory predictor, an expected fuel usage for a flight along a desired route, and determining, via at least one processor, an available cargo capacity for the flight along the desired route based at least in part on the expected fuel usage. In addition, the method includes determining, via the at least one processor and the trajectory predictor, a passenger ticket price, a cargo price, and a fuel quantity based at least in part on an available seating capacity, an expected passenger demand, the available cargo capacity, and an expected cargo demand to enhance profitability of a flight network. The method also includes outputting the passenger ticket price, the cargo price, and the fuel quantity to a user interface, to a storage device, and/or to a network.

19 Claims, 7 Drawing Sheets

(56) References Cited

U.S. PATENT DOCUMENTS

2012/0310706 A1    12/2012  Nguyen et al.
2013/0046422 A1*    2/2013  Cabos .............................. 701/3
2013/0085672 A1*    4/2013  Stewart et al. ................ 701/528
2014/0129281 A1*    5/2014  Struzik ........................ 705/7.23

OTHER PUBLICATIONS

McGill et al., "Revenue Management: Research Overview and Prospects", Transportation Science, vol. 33, Issue 2, pp. 233-256, May 1999.
Talluri., "Airline Revenue Management With Passenger Routing Control: A New Model With Solution Approaches", International Journal of Services Technology and Management, vol. 2, Issue 1, pp. 102-115, 2001.
Bitran et al., "An Overview of Pricing Models for Revenue Management", Manufacturing & Service Operations Management, vol. 5, Issue 3, pp. 203-229, Dec. 2002.
Popescu., "Air Cargo Revenue and Capacity Management", Ph.D. Thesis, Georgia Institute of Technology, 2006.
"Analysis of Future Issues and Changing Demands on the System", Nation Surface Transportation Policy and Revenue Study Commission, vol. 3, Jan. 12, 2007.
Amaruchkul et al., "Single-leg air-cargo revenue management", Transportation Science, vol. 41, Issue 4, pp. 457-469, Nov. 2007.
Kasilingam et al., "Revenue Management and Air Cargo", American Friendship, 2011.

* cited by examiner

SYSTEM AND METHOD FOR DETERMINING AIRCRAFT PAYLOADS TO ENHANCE PROFITABILITY

BACKGROUND

The subject matter disclosed herein relates to a system and method for determining aircraft payloads to enhance profitability.

Commercial aircraft typically include a storage compartment (e.g., storage hold) configured to facilitate transportation of passenger baggage. The volume of certain storage compartments is larger than the expected volume of passenger baggage for a flight along a desired route. Accordingly, the excess volume of such storage compartments may be utilized to transport cargo along the desired route. Selling the excess volume to companies and/or individuals for cargo transportation enhances the profitability of the flight by increasing the utilization of available resources (e.g., the excess storage volume and/or the excess lifting capacity of the aircraft). However, transporting cargo increases the weight of the aircraft, thereby increasing fuel usage during the flight. In addition, the weight of the cargo and/or the volume of the cargo within the storage compartment may reduce the available passenger capacity of the aircraft (e.g., by decreasing the storage volume for passenger baggage and/or by reducing the available lifting capacity of the aircraft). Accordingly, pricing cargo too cheaply may reduce the profitability of a flight due to excessive fuel usage and/or reduced passenger capacity. Conversely, pricing cargo too expensively may reduce the profitability of the flight due to inefficient use of available resources. For example, a high cargo price may reduce demand for the excess volume within the storage compartment, thereby decreasing the cargo carried by the flight. As a result, the overall profitability of the flight may be reduced.

BRIEF DESCRIPTION

In one embodiment, a computer implemented method for managing aircraft operations includes receiving an available seating capacity for a flight along a desired route. The flight along the desired route is one of multiple flights within a flight network. The method also includes receiving an expected passenger demand for the flight along the desired route, and receiving an expected cargo demand for the flight along the desired route. In addition, the method includes determining, via a trajectory predictor, an expected fuel usage for the flight along the desired route. The method also includes determining, via at least one processor, an available cargo capacity for the flight along the desired route based at least in part on the expected fuel usage. Furthermore, the method includes determining, via the at least one processor and the trajectory predictor, a passenger ticket price, a cargo price, and a fuel quantity based at least in part on the available seating capacity, the expected passenger demand, the available cargo capacity, and the expected cargo demand to enhance profitability of the flight network. The method also includes outputting the passenger ticket price, the cargo price, and the fuel quantity to a user interface, to a storage device, to a network, or a combination thereof.

In another embodiment, a computer implemented method for managing aircraft operations includes receiving an updated flight plan for a flight along a desired route and/or measured weather conditions for the flight along the desired route. The updated flight plan is updated during a preflight phase from a flight plan determined during a planning phase, the measured weather conditions are updated during the preflight phase from expected weather conditions determined during the planning phase, and the flight along the desired route is one of multiple flights within a flight network. The method also includes determining, via a trajectory predictor, an expected fuel usage for the flight along the desired route based at least in part on the updated flight plan and/or the measured weather conditions. In addition, the method includes determining, via at least one processor, an expected weight of an aircraft associated with the flight along the desired route based at least in part on the expected fuel usage. The method also includes determining, via the at least one processor, whether to reroute passengers and/or whether to reroute cargo during the preflight phase based at least in part on the expected fuel usage and the expected weight to enhance profitability of the flight network. Furthermore, the method includes outputting data associated with rerouting the passengers and/or data associated with rerouting the cargo to a user interface, to a storage device, to a network, or a combination thereof.

In a further embodiment, a system for managing aircraft operations includes a trajectory predictor configured to determine an expected fuel usage for a flight along a desired route based at least in part on a flight plan, an aircraft type, expected weather conditions, or a combination thereof, for the flight along the desired route. The flight along the desired route is one of multiple flights within a flight network. The system also includes a memory operatively coupled to a processor and configured for storing data and instructions that, when executed by the processor, cause the system to perform a method including determining an available cargo capacity for the flight along the desired route based at least in part on the expected fuel usage. The method also includes determining, in cooperation with the trajectory predictor, a passenger ticket price, a cargo price, and a fuel quantity based at least in part on an available seating capacity, an expected passenger demand, the available cargo capacity, and an expected cargo demand to enhance profitability of the flight network. In addition, the method includes outputting the passenger ticket price, the cargo price, and the fuel quantity to a user interface, to a storage device, to a network, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may determine a passenger ticket price and a cargo price for at least one flight within a flight network to enhance profitability of the network. For example, in certain embodiments, a method for managing aircraft operations includes receiving an available seating capacity for a flight along the desired route, receiving an expected passenger demand for the flight along the desired route, and receiving an expected cargo demand for the flight along the desired route. The flight along the desired route is one of multiple flights within the flight network. An expected fuel usage for the flight along the desired route is determined by a trajectory predictor, such as a flight management system or a universal trajectory predictor. Available cargo capacity is then determined based at least in part on the expected fuel usage. Next, a passenger ticket price, a cargo price, and a fuel quantity are determined based at least in part on the available seating capacity, the expected passenger demand, the available cargo capacity, and the expected cargo demand to enhance profitability of the flight network. By integrating the determination of passenger ticket price, cargo price, and fuel quantity, network-wide revenue from passenger ticket sales and cargo sales may be increased while fuel costs are reduced. Accordingly, the method described herein may increase profitability of a flight network, as compared to pricing strategies that determine passenger ticket price and cargo price independently and/or do not consider expected fuel usage in determining the cargo price.

Figure 1:
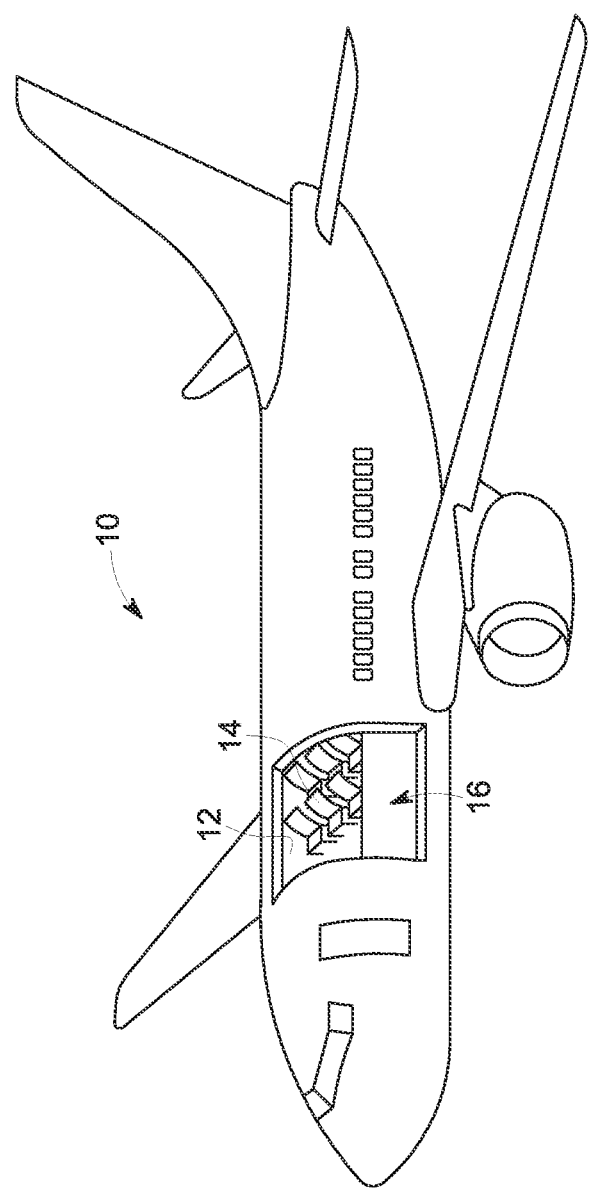
FIG. 1 is a perspective view of an embodiment of an aircraft having passenger seating and a cargo compartment.

FIG. 1 is a perspective view of an embodiment of an aircraft 10 having passenger seating and a cargo compartment. As illustrated, the aircraft 10 includes an interior 12 configured to accommodate passengers and cargo. The interior 12 includes passenger seating 14 (e.g., rows of passenger seats) and a storage compartment 16 (e.g., storage hold) configured to store passenger baggage and/or cargo. As discussed in detail below, the aircraft may be associated with a flight along a desired route. The flight, in turn, may be one of a number of flights within a flight network. During a planning phase of the flight, a passenger ticket price, a cargo price, and a fuel quantity may be determined to enhance the profitability of the flight network. For example, in certain embodiments, a system for managing aircraft operations includes a trajectory predictor and at least one processor. The trajectory predictor is configured to determine an expected fuel usage for a flight along a desired route based at least in part on a flight plan, an aircraft type, and/or expected weather conditions for the flight along the desired route. The flight along the desired route is one of multiple flights within a flight network. The processor(s) are configured to determine an available cargo capacity for the flight along the desired route based at least in part on the expected fuel usage. Furthermore, the trajectory predictor and the processor(s) are configured to cooperatively determine a passenger ticket price, a cargo price, and a fuel quantity based at least in part on an available seating capacity, an expected passenger demand, the available cargo capacity, and an expected cargo demand to enhance the profitability of the flight network. The passenger ticket price, the cargo price, and the fuel quantity are then output to a user interface, to a storage device, and/or to a network. By integrating the determination of passenger ticket price, cargo price, and fuel quantity for at least one flight within the network, the profitability of the flight network may be enhanced, as compared to pricing strategies in which the passenger ticket price and the cargo price are independently determined and/or in which the expected fuel usage is not considered in determining the cargo price.

In certain embodiments, the processor(s) and the trajectory predictor are configured to cooperatively determine whether to reroute passengers and/or whether to reroute cargo during a preflight phase based at least in part on an updated flight plan and/or measured whether conditions for the flight along the desired route to enhance profitability of the flight network. For example, the trajectory predictor may determine an expected fuel usage based at least in part on the updated flight plan and/or the measured whether conditions. If the expected fuel usage is greater than the fuel usage determined during the planning phase, the processor(s) determine the expected network-wide losses associated with providing the additional fuel, with rerouting passengers, and with rerouting cargo. The processor(s) then determine which passengers to reroute, if any, and/or which cargo to reroute, if any, to reduce the expected network-wide losses, thereby enhancing profitability of the flight network.

Figure 2:
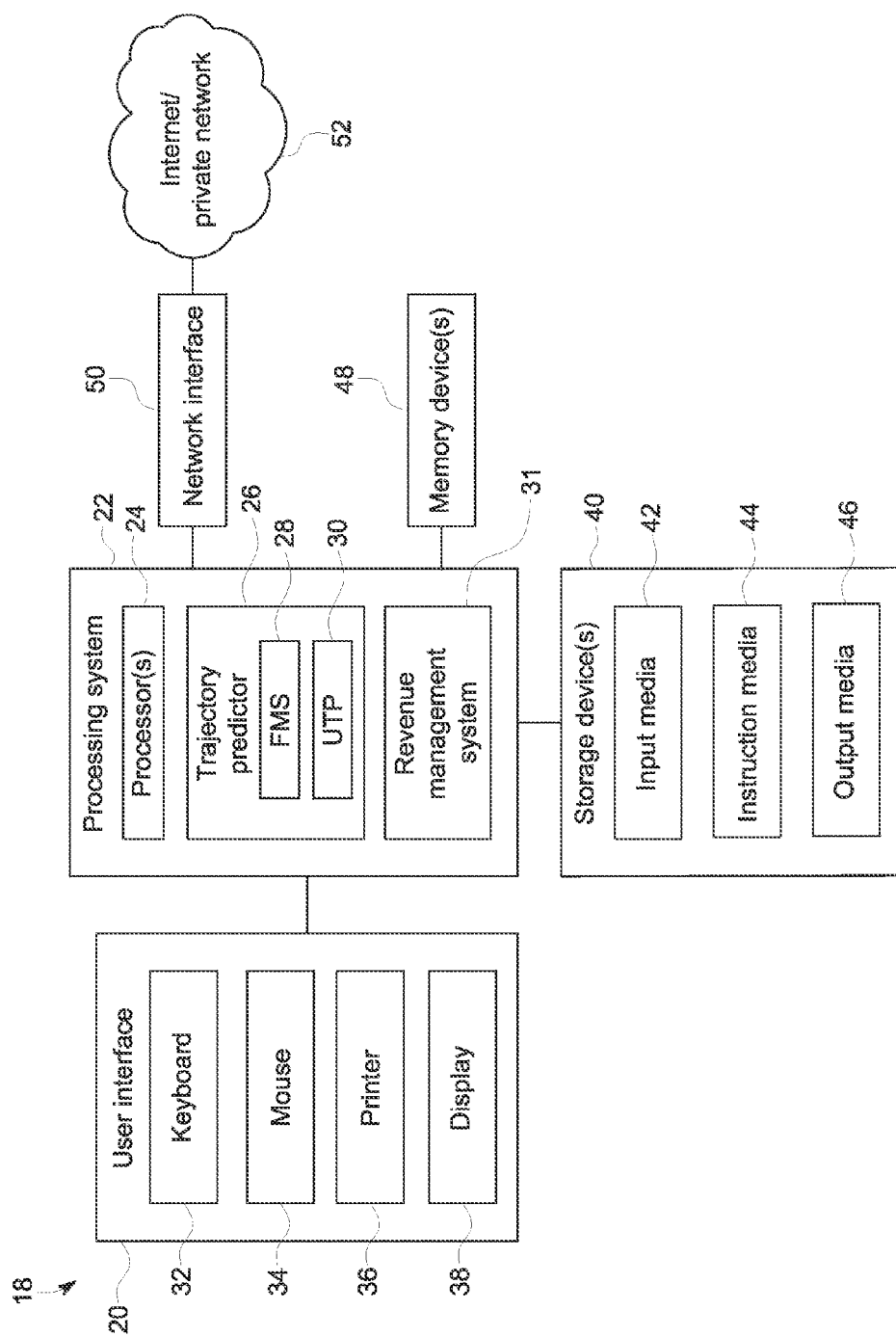
FIG. 2 is a block diagram of an embodiment of an aircraft operations management system.

FIG. 2 is a block diagram of an embodiment of an aircraft operations management system 18. As illustrated, the aircraft operations management system 18 includes a user interface 20 and a processing system 22. In certain embodiments, the processing system 22 is configured to determine a passenger ticket price, a cargo price, and a fuel quantity during a planning phase, and/or to determine whether to reroute passengers and/or cargo during a preflight phase. In the illustrated embodiment, the processing system 22 includes one or more processors 24, which may be used to execute software, such as passenger ticket price/cargo price determination software, passenger/cargo rerouting software, and so forth. Moreover, the processor(s) 24 may include one or more microprocessors, such as one or more "general-purpose" microprocessors, one or more special-purpose microprocessors and/or application specific integrated circuits (ASICS), or some combination thereof. For example, the processor(s) 24 may include one or more reduced instruction set (RISC) processors.

The processing system 22 also includes a trajectory predictor 26. The trajectory predictor 26 is configured to simulate the flight along the desired route to determine fuel usage, among other operational parameters. In certain embodiments, the trajectory predictor 26 utilizes a flight management system (FMS) 28 that substantially corresponds to an onboard flight management system of an aircraft associated with the flight along the desired route. For example, certain aircraft include a flight management system to compute a desired trajectory and/or expected operational parameters (e.g., fuel usage, flight time, etc.) during operation of the aircraft. The computations may be based at least in part on a flight plan, aircraft type, weather conditions, and/or flight specific performance information (e.g., aircraft load, engine performance, etc.). In certain configurations, the onboard flight management system may output the computed trajectory to a flight control system, which, in turn, automatically guides the aircraft along the computed trajectory. Because the trajectory predictor 26 utilizes a flight management system 28 that substantially corresponds to the onboard flight management system (e.g., the trajectory predictor 26 computes substantially similar trajectories and/or operational parameters as the onboard flight management system based on substantially similar inputs), an accurate determination of fuel usage for the flight along the desired route is determined. In alternative embodiments, the trajectory predictor 26 may utilize a universal trajectory predictor (UTP) 30, which is configured to simulate operation of a generic aircraft (e.g., an aircraft having performance, which may be defined by various input parameters, that approximates the performance of the aircraft associated with the flight along the desired route) to determine expected fuel usage.

In addition, the processing system 22 includes a revenue management system 31. The revenue management system 31 is configured to determine passenger ticket prices based on fare class (e.g., first class, business class, coach, etc.) and/or date of purchase (e.g., ticket prices may increase as the departure date/time of the flight approaches), among other factors. For example, the revenue management system 31, the processor(s) 24, and the trajectory predictor 26 may cooperatively determine fare class specific passenger ticket prices that enhance profitability of a flight network.

The trajectory predictor 26 and the revenue management system 31 may include one or more processors, which may be used to execute software, such as trajectory prediction software, revenue management software, and so forth. The processors within the trajectory predictor and the revenue management system may include one or more microprocessors, such as one or more "general-purpose" microprocessors, one or more special-purpose microprocessors and/or application specific integrated circuits (ASICS), or some combination thereof. In certain embodiments, the trajectory predictor may include an FMS module that substantially corresponds to the onboard flight management system of an aircraft (e.g., hardware-in-the-loop). Furthermore, in certain embodiments, the revenue management system 31 may be incorporated within a remote computing system and communicate with the processor(s) 24 and/or the trajectory predictor 26 (e.g., via a network).

As illustrated, the user interface 20 of the aircraft operations management system 18 includes multiple devices configured to enable an operator to provide input and receive output from the processing system 22. In the illustrated embodiment, the user interface includes a keyboard 32 and a mouse 34 for inputting data, making selections, and/or operating the aircraft operations management system 18. Furthermore, the user interface 20 includes a printer 36 for printing data, such as for printing a passenger ticket price, a cargo price, and/or fuel quantity. The user interface 20 also includes a display 38 to present visual data to an operator, such as data corresponding to a passenger ticket price, cargo price, and/or fuel quantity. While the illustrated embodiment includes a keyboard 32, a mouse 34, a printer 36, and a display 38, it should be appreciated that, in alternative embodiments, the user interface 20 may include more or fewer input and/or output devices.

In the illustrated embodiment, the aircraft operations management system 18 includes storage device(s) 40 (e.g., non-transitory storage media), such as read-only memory (ROM), flash memory, a hard drive, or any other suitable optical, magnetic, or solid-state storage medium, or a combination thereof. The storage device(s) 40 may store data (e.g., input data, output data, etc.), instructions (e.g., software or firmware for determining passenger ticket price, cargo price, and fuel quantity, software or firmware for determining whether to reroute passengers and/or cargo, etc.), and any other suitable data. For example, in the illustrated embodiment, the storage device(s) 40 include input media 42, instruction media 44, and output media 46. The input media 42 may store data indicative of available seating capacity, expected passenger demand, and/or expected cargo demand, among other data. In addition, the instruction media 44 may store data indicative of instructions for determining passenger ticket price, cargo price, and fuel quantity, and/or instructions for determining whether to reroute passengers and/or cargo, among other data. The output media 46 may store data indicative of passenger ticket price, cargo price, and fuel quantity, and/or data indicative of which passengers and/or which cargo to reroute, among other data. While the illustrated storage device(s) 40 include input media, instruction media, and output media, it should be appreciated that, in certain embodiments, these media may be combined into one or two media, or separated into additional media (e.g., media for each input, media for each output, etc.). Furthermore, it should be appreciated that the storage device(s) may include additional media in alternative embodiments.

In the illustrated embodiment, the aircraft operations management system 18 includes memory device(s) 48 having volatile memory, such as random access memory (RAM), and/or nonvolatile memory, such as ROM. The memory device(s) 48 may store a variety of information and may be used for various purposes. For example, the memory device(s) 48 may store processor-executable instructions (e.g., firmware or software) for the processing system 22 to execute, such as instructions for passenger ticket price/cargo price determination software, and/or instructions for passenger/cargo rerouting software.

Furthermore, in the illustrated embodiment, the aircraft operations management system 18 includes a network interface 50 configured to establish a data connection between the processing system 22 and a private network or the internet 52. The network interface 50 may utilize any suitable communication protocol, such as Ethernet or Wi-Fi, for example. In certain embodiments, the network interface 50 is configured to receive input data from a remote processing system, and/or the network interface 50 is configured to transmit output data to a remote processing system. For example, the network interface 50 may be configured to receive data indicative of available seating capacity, expected passenger demand, and/or expected cargo demand, among other data (e.g., from a flight scheduling system, a remote user interface, etc.). In addition, the network interface 50 may be configured to transmit data indicative of passenger ticket price, cargo price, and fuel quantity, and/or data indicative of which passengers and/or which cargo to reroute, among other data (e.g., to a flight scheduling system, to a remote user interface, etc.).

In certain embodiments, the processing system 22 is configured to determine a passenger ticket price, a cargo price, and a fuel quantity during a planning phase to enhance profitability of a flight network. In such embodiments, the trajectory predictor 26 is configured to determine an expected fuel usage for a flight along a desired route based at least in part on a flight plan, an aircraft type, expected weather conditions (e.g., from the user interface 20, from the input media 42, and/or from the network 52), an expected payload, or a combination thereof. The flight along the desired route is one of multiple flights within the flight network. The processor(s) 24 are configured to determine an available cargo capacity for the flight along the desired route based at least in part on the expected fuel usage. In addition, the trajectory predictor 26 and the processor(s) 24 are configured to cooperatively determine a passenger ticket price, a cargo price, and a fuel quantity based at least in part on an available seating capacity, an expected passenger demand, the available cargo capacity, and an expected cargo demand to enhance profitability of the flight network. The trajectory predictor 26 and the processor(s) 24 are also configured to cooperatively output the passenger ticket price, the cargo price, and the fuel quantity to the user interface 20, to the output media 46, and/or to the network 52.

In further embodiments, the processing system 22 is configured to determine whether to reroute passengers and/or whether to reroute cargo during a preflight phase to enhance the profitability of the flight network. In such embodiments, the trajectory predictor 26 and the processor(s) 24 are configured to cooperatively determine whether to reroute passengers and/or whether to reroute cargo during the preflight phase based at least in part on an updated flight plan and/or measured weather conditions for the flight along the desired route (e.g., from the user interface 20, from the input media 42, and/or from the network 52) to enhance profitability of the flight network. Furthermore, the processor(s) 24 may determine which passengers to reroute and/or which cargo to reroute based at least in part on expected network-wide losses associated with rerouting the passengers and/or with rerouting the cargo. The processor(s) 24 may then output the list of passengers to reroute and/or the list of cargo to reroute to the user interface 20, to the output media 46, and/or to the network 52.

Figure 3:
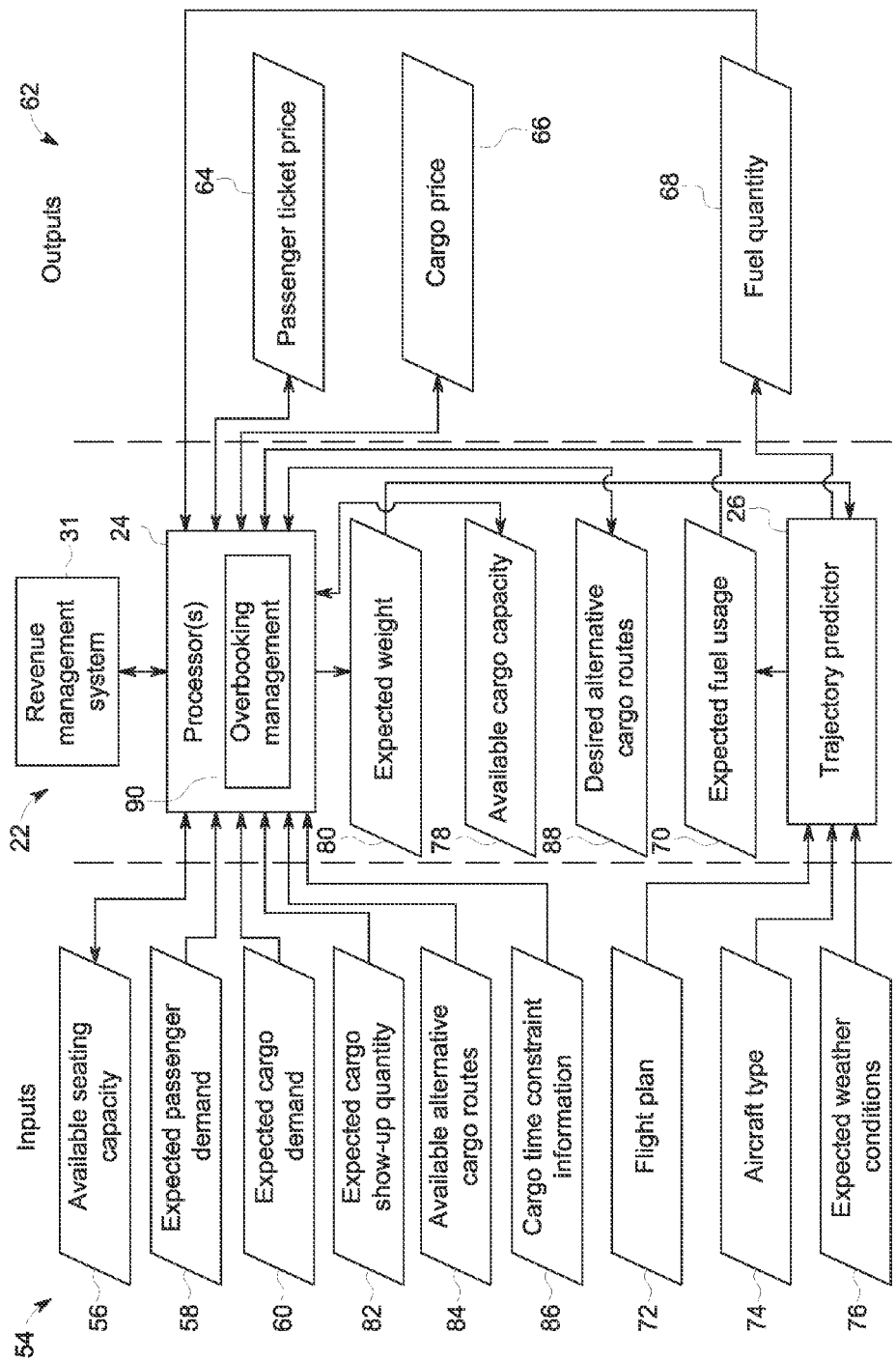
FIG. 3 is a block diagram of an embodiment of a processing system that may be employed within the aircraft operations management system of FIG. 2, in which the processing system is configured to determine passenger ticket price, cargo price, and fuel quantity during a planning phase.

FIG. 3 is a block diagram of an embodiment of a processing system 22 that may be employed within the aircraft operations management system of FIG. 2, in which the processing system is configured to determine passenger ticket price, cargo price, and fuel quantity during a planning phase. The planning phase may begin about one day to about three weeks before the flight. For example the planning phase may begin about three weeks, about two weeks, about 1.5 weeks, about one week, about six days, about five days, about four days, about three days, about two days, or about one day before the scheduled departure date of the flight. During the planning phase, the aircraft operations management system determines a passenger ticket price (e.g., a fare class specific passenger ticket price) for the remaining unsold seats aboard the aircraft, and a cargo price (e.g., a cargo bid price) for the remaining cargo capacity of the aircraft.

As discussed in detail below, the passenger ticket price and the cargo price of at least one flight within a flight network are selected to enhance profitability of the flight network. The flight network includes multiples flights for one or more aircraft (e.g., each aircraft within a fleet of aircraft). For example, the flight network may include all aircraft of an airline that are scheduled during the planning phase and/or during the preflight phase. As discussed in detail below, the selected passenger ticket price and the selected cargo price may reduce profitability of a corresponding flight, but may enhance the profitability of the flight network (e.g., by increasing profitability of other flights within the network). Furthermore, while selecting a passenger ticket price and a cargo price for a single aircraft within the flight network is described herein, it should be appreciated that passenger ticket prices and cargo prices may be selected for each aircraft within the flight network to enhance profitability of the network.

As illustrated, the processor(s) 24 and the trajectory predictor 26 of the processing system 22 are configured to receive multiple inputs 54 to facilitate determination of the passenger ticket price, the cargo price, and the fuel quantity. In the illustrated embodiment, the processor(s) 24 are configured to receive available seating capacity 56 for a flight along a desired route, expected passenger demand 58 for the flight along the desired route, and expected cargo demand 60 for the flight along the desired route. The available seating capacity 56 may include a number of unsold seats (e.g., a number of seats that have not been sold at the beginning of the planning phase) and/or a class of each unsold seat (e.g., an indication of whether the unsold seat is within first class, coach, by an isle, by a window, within an exit row, etc.).

Furthermore, the expected passenger demand 58 may include a parameter indicative of the likelihood of passenger ticket sales during the period between the beginning of the planning phase and the beginning of the preflight phase (e.g., less than 24 hours before the flight), which may be based on a historic distribution of booking profiles by fare class, among other factors. The expected passenger demand 58 may also include a relationship (e.g., table, empirical equation, etc.) between ticket price and an expected number of passenger ticket sales. The expected passenger demand may be based at least in part on the date of the flight (e.g., during a holiday season, during the summer, etc.), the origin location, the destination location, the scheduled departure time, the scheduled arrival time, and/or other itinerary attributes.

Similarly, the expected cargo demand 60 may include a parameter indicative of the likelihood of cargo sales during the period between the beginning of the planning phase and the beginning of the preflight phase (e.g., less than 24 hours before the flight), which may be based on a historic distribution of cargo booking profiles, among other factors. The expected cargo demand 60 may also include a relationship (e.g., table, empirical equation, etc.) between cargo price and an expected quantity of cargo sales. The expected cargo demand may be based at least in part on the date of the flight (e.g., during a holiday season, during the summer, etc.), the origin location, and/or the destination location. In certain embodiments, the expected cargo demand 60 may be class specific. For example, the expected cargo demand 60 may include a first demand for cargo of a first class (e.g., having a higher density) and a second demand for cargo of a second class (e.g., having lower density). Accordingly, as discussed in detail below, a cargo price may be determined for cargo of each class (e.g., higher density cargo may be priced lower than lower density cargo because the higher density cargo may utilize less volume within the storage compartment).

As discussed in detail below, the processing system 22 generates multiple outputs 62 based on the inputs 54. In the illustrated embodiment, the outputs 62 include a passenger ticket price 64, a cargo price 66, and a fuel quantity 68. The passenger ticket price 64 may include a single value for each remaining seat aboard the aircraft, or the passenger ticket price 64 may include multiple values that depend on fare class (e.g., first class, business class, coach, etc.) and/or date of purchase (e.g., ticket prices may increase as the departure date/time of the flight approaches), among other factors. As discussed in detail below, the passenger ticket price 64 may be adjusted based on input from the revenue management system 31. For example, the revenue management system 31 may generate fare class specific passenger ticket prices for each passenger scheduled to fly along a respective itinerary path. Furthermore, the cargo price 66 may include a single value for each kilogram of available cargo capacity, or the cargo price 66 may include multiple values that depend on the class of cargo (e.g., lower density cargo may be priced higher than higher density cargo due to the increased volume associated with each kilogram of cargo), the priority of the cargo (e.g., higher priority cargo may be priced higher than lower priority cargo), and/or the date of purchase (e.g., cargo prices may increase as the departure date/time of the flight approaches), among other factors. For example, the cargo price 66 may include a base price and a variable adjustment, the cargo price 66 may include a table or list of prices, and/or the cargo price 66 may include a relationship that determines the price based on various factors. In certain embodiments, the cargo price 66 may be a cargo bid price that corresponds to a minimum asking price for cargo transportation. In such embodiments, cargo transporters may bid against one another (e.g., starting from the cargo bid price) to establish the actual cargo price. In addition, the fuel quantity 68 may include a total weight of the fuel loaded onto the aircraft, a total volume of the fuel loaded onto the aircraft, or a fraction of the aircraft fuel storage capacity, among other measures of fuel quantity.

In the illustrated embodiment, the trajectory predictor 26 determines an expected fuel usage 70 for the flight along the desired route. As previously discussed, the trajectory predictor 26 may utilize a flight management system that substantially corresponds to an onboard flight management system of an aircraft associated with the flight along the desired route. Alternatively, the trajectory predictor may utilize a universal trajectory predictor configured to simulate operation of a generic aircraft to determine expected fuel usage. In the illustrated embodiment, the trajectory predictor 26 receives a flight plan 72, an aircraft type 74, and expected weather conditions 76 for the flight along the desired route. The flight plan 72 may include a series of maneuvers that directs the aircraft from the origin to the destination. For example, the flight plan 72 may include a takeoff maneuver, various turning maneuvers, and a landing maneuver, among other maneuvers associated with various flight phases. In addition, the aircraft type 74 may include data that specifically identifies the aircraft model and/or the specific aircraft (e.g., by tail number). Furthermore, the expected weather conditions 76 may include expected wind direction and/or velocity, air temperature, air pressure, and so forth, for the day of the flight. In certain embodiments, the trajectory predictor 26 is configured to determine the expected fuel usage based at least in part on the flight plan 72, the aircraft type 74, and the expected weather conditions 76 for the flight along the desired route. For example, the trajectory predictor 26 may simulate the flight based on the input parameters and determine the expected fuel usage 70 based on the simulation.

As illustrated, the expected fuel usage 70 is output to the processor(s) 24. The processor(s) 24, in turn, determine an available cargo capacity 78 based on the expected fuel usage 70. For example, in certain embodiments, the processor(s) 24 determine the available cargo capacity 78 by subtracting an expected fuel load (e.g., which may be determined based on the expected fuel usage 70 and a weight of the reserve fuel), an expected passenger load, an expected crew load (e.g., which may be determined based on the expected number of crew members), and an expected reserved cargo load (e.g., cargo capacity reserved for major shippers) from the total lifting capacity of the aircraft. The expected passenger load may be determined based on a number of passengers expected to board the aircraft. For example, in certain embodiments, the processor(s) 24 determine the number of expected passengers based on the available seating capacity 56 and the expected passenger demand 58. The processor(s) then convert the expected number of passengers into an expected passenger load. For example, the passenger load may include an estimated total passenger weight (e.g., which may be determined by multiplying an estimated average weight of each passenger by the expected number of passengers) and an estimated total baggage weight. The estimated total baggage weight may be determined by adding an expected checked baggage weight (e.g., which may be determined by multiplying an estimated average checked bag weight by the number of checked bags) to an expected carry-on baggage weight (e.g., which may be determined by multiplying an estimated average carry-on bag weight by the number of passengers).

In certain embodiments, the available cargo capacity 78 may also include a volumetric storage capacity for cargo within the aircraft storage compartment. In such embodiments, the processor(s) 24 determine the volume of the storage compartment available for cargo by subtracting an expected reserved cargo volume (e.g., which may be determined based on the expected reserved cargo load and an expected reserved cargo density) and an estimated passenger baggage volume (e.g., which may be determined based on the expected checked baggage weight and an estimated checked baggage density) from the total storage volume of the storage compartment. Depending on the expected density of the cargo, the available cargo capacity 78 may correspond to the weight-based storage capacity or the volumetric storage capacity. For example, the available cargo capacity 78 for lower density cargo may be determined based on the volume of the storage compartment available for cargo. Accordingly, the maximum cargo load for lower density cargo may be less than the maximum cargo load for higher density cargo (e.g., in which the maximum cargo load is determined based on the weight-based storage capacity).

Once the available cargo capacity 78 is determined, the processor(s) 24 and the trajectory predictor 26 cooperatively determine the passenger ticket price 64, the cargo price 66, and the fuel quantity 68 based at least in part on the available seating capacity 56, the expected passenger demand 58, the expected cargo demand 60, and the available cargo capacity 78. For example, in certain embodiments, the processor(s) 24 select an initial passenger ticket price 64 and an initial cargo price 66 (e.g., based on historical values for the flight along the desired route, the date of the flight, the available alternative flights, etc.). The processor(s) 24 then determine an expected weight 80 of the aircraft based at least in part on the initial passenger ticket price 64 and the initial cargo price 66. The expected weight 80 of the aircraft includes basic empty weight (e.g., the weight of the unfueled and unloaded aircraft), the expected fuel load, the expected passenger load, the expected crew load, the expected reserved cargo load, and the expected cargo load.

The expected cargo load is based at least in part on the cargo price 66, the available cargo capacity 78, the expected cargo demand 60, and existing cargo commitments. For example, a lower cargo price 66 and a higher cargo demand 60 may result in increased cargo sales, thereby filling a larger portion of the available cargo capacity 78. Conversely, a higher cargo price 66 and a lower cargo demand 60 may result in decreased cargo sales, thereby filling a smaller portion of the available cargo capacity 78. The processor(s) 24 are configured to determine a fraction of the available cargo capacity 78 expected to be filled based on the expected cargo demand

60 and the cargo price 66, thereby enabling the processor(s) 24 to determine the expected cargo load.

Furthermore, the expected passenger load is based at least in part on the passenger ticket price 64, the available seating capacity 56, the expected passenger demand 58, and existing passenger bookings. For example, a lower passenger ticket price 64 and a higher passenger demand 58 may result in increased ticket sales, thereby filling a larger portion of the available seating capacity 56. Conversely, a higher passenger ticket price 64 and a lower passenger demand 58 may result in decreased ticket sales, thereby filling a smaller portion of the available seating capacity 56. The processor(s) 24 are configured to determine a fraction of the available seating capacity 56 expected to be filled based on the expected passenger demand 58 and the passenger ticket price 64, thereby enabling the processor(s) 24 to determine the expected passenger load.

Once the expected cargo load and the expected passenger load are determined, the loads are added to the basic empty weight, the expected fuel load, the expected crew load, and the expected reserved cargo load, to determine the expected weight 80 of the aircraft. The expected weight 80 is output from the processor(s) 24 to the trajectory predictor 26. The trajectory predictor 26, in turn, determines the fuel quantity 68 based at least in part on the expected weight 80 of the aircraft. For example, the trajectory predictor 26 may simulate the flight along the desired route based at least in part on the expected weight 80 of the aircraft, the flight plan 72, the aircraft type 74, and the expected weather conditions 76, thereby enabling the trajectory predictor 26 to determine the fuel quantity 68. The fuel quantity 68 is output from the trajectory predictor 26 to the processor(s) 24. The processor(s) 24 then redetermine the expected fuel load based on the updated fuel quantity, redetermine the expected weight 80 based on the updated fuel load, and output the expected weight 80 to the trajectory predictor 26. The trajectory predictor 26, in turn, redetermines the fuel quantity 68 based on the updated expected weight 80. This process repeats until the fuel quantity 68 converges (e.g., until the difference in fuel quantity between two successive iterations is less than a threshold value). In certain embodiments, during each iteration, a total expected load (e.g., the expected weight 80 minus the basic empty weight of the aircraft) is compared to the maximum lifting capacity of the aircraft. If the total expected load exceeds the maximum lifting capacity, the processor(s) 24 reduce the available cargo capacity 78, and redetermine the expected cargo load and the expected weight 80. The process of determining the fuel quantity 80 then continues until a converged fuel quantity is achieved. The profit resulting from the flight along the desired route is then determined based on the expected revenue from the passenger ticket sales (e.g., which may be determined based on the expected number of passenger ticket sales and the passenger ticket price 64), the expected revenue from the cargo sales (e.g., which may be determined based on the expected cargo sales and the cargo price 66), and the fuel costs (e.g., which may be determined based on the expected fuel price and the fuel quantity 68).

Next, the processor(s) 24 iteratively adjust the passenger ticket price 64 and the cargo price 66 until the profitability of the flight network is enhanced to a desired degree. By way of example, the processor(s) 24 may increase the passenger ticket price 64 from the initial passenger ticket price and redetermine the expected weight 80 of the aircraft based on the increased passenger ticket price. For example, increasing the passenger ticket price 64 may result in fewer ticket sales, thereby reducing passenger load and/or passenger baggage volume. However, depending on the cargo price 66, the expected cargo demand 60, and the available cargo capacity 78 (e.g., which may be determined based at least in part on the expected fuel load, the expected passenger load, the expected crew load, and the expected reserved cargo load, and/or based at least in part on the expected reserved cargo volume and the estimated passenger baggage volume), the reduced passenger load/passenger baggage volume may facilitate increased cargo sales, thereby increasing the expected cargo load. Once the expected weight 80 of the aircraft is determined (e.g., based on the updated passenger load and the updated cargo load), the trajectory predictor 26 redetermines the fuel quantity 68 based at least in part on the updated expected weight 80. The profitability of the flight network is then redetermined based on the expected revenue from the passenger ticket sales, the expected revenue from the cargo sales, the fuel costs, and non-fuel operating costs. The profitability is compared to the profitability associated with the initial passenger ticket price and the initial cargo price, or with a passenger ticket price/cargo price from a prior iteration. Once a stopping condition is reached, the passenger ticket price 64, the cargo price 66, and the fuel quantity 68 are output to the user interface, to the output media, and/or to the network. Otherwise, the passenger ticket price and/or the cargo price are adjusted, and the process of determining profitability is repeated. In certain embodiments, the stopping condition may include the profitability of the flight network being enhanced to a desired degree (e.g., the increase in profitability from the initial profitability is greater than a threshold value), a variation in the profitability between iterations decreasing below a threshold value (e.g., indicating the profitability is approaching a desired value), and/or a maximum number of iterations being reached, among other stopping conditions.

By way of further example, the processor(s) 24 may decrease the cargo price 66 from the initial cargo price and redetermine the expected weight 80 of the aircraft based on the reduced cargo price. For example, decreasing the cargo price 66 may result in additional cargo sales, thereby increasing cargo load and cargo volume. However, depending on the passenger ticket price 64, the expected passenger demand 58, and the available seating capacity 56, the increased cargo load/volume may result in reduced passenger ticket sales (e.g., because the increased cargo load may limit the passenger load, and/or because the increased cargo volume may limit passenger baggage volume), thereby decreasing the expected passenger load. Once the expected weight 80 of the aircraft is determined (e.g., based on the updated passenger load and the updated cargo load), the trajectory predictor 26 redetermines the fuel quantity 68 based at least in part on the updated expected weight 80. The profitability of the flight network is then redetermined based on the expected revenue from the passenger ticket sales, the expected revenue from the cargo sales, the fuel costs, and non-fuel operating costs. The profitability is compared to the profitability associated with the initial passenger ticket price and the initial cargo price, or with a passenger ticket price/cargo price from a prior iteration. Once a stopping condition is reached, the passenger ticket price 64, the cargo price 66, and the fuel quantity 68 are output to the user interface, to the output media, and/or to the network. Otherwise, the passenger ticket price and/or the cargo price are adjusted, and the process of determining profitability is repeated. In certain embodiments, the stopping condition may include the profitability of the flight network being enhanced to a desired degree (e.g., the increase in profitability from the initial profitability is greater than a threshold value), a variation in the profitability between iterations decreasing below a threshold value (e.g., indicating the profitability is approaching a desired value), and/or a maximum number of iterations being reached, among other stopping conditions.

In certain embodiments, the processing system 22 is configured to receive an expected cargo show-up quantity 82 and to determine the available cargo capacity 78 based at least in part on the expected cargo show-up quantity 82. The expected cargo show-up quantity 82 may include weight and/or volume of the cargo expected to reach a cargo terminal by the departure date/time of the flight. The expected cargo show-up quantity 82 may be based at least in part on the date of the flight (e.g., whether the flight is scheduled during a holiday season, during a period of inclement weather, etc.), the origin location, and/or the destination location. In certain embodiments, the processing system 22 is configured to adjust the available cargo capacity 78 based on the expected cargo show-up quantity 82. For example, the processor(s) 24 may increase the available cargo capacity by an amount equal to the quantity of cargo that is expected to not reach the cargo terminal by the departure date/time of the flight. By way of example, if 3000 kilograms of cargo is expected to not reach the cargo terminal by the departure date/time based on the expected cargo show-up quantity, the processing system 22 may increase the available cargo capacity by 3000 kilograms. Similarly, if 30 cubic meters of cargo is expected to not reach the cargo terminal by the departure date/time based on the expected cargo show-up quantity, the processing system 22 may increase the available cargo volume by 30 cubic meters.

In certain embodiments, the processor(s) 24 are configured to receive available alternative cargo routes 84 and cargo time constraint information 86. The available alternative cargo routes 84 may include a list of routes (e.g., direct or indirect routes including one or more flights) from the origin to the destination, and an expected time of arrival for a flight (e.g., the final flight) associated with each route. In addition, the cargo time constraint information 86 may include a time range (e.g., a maximum date/time) for which the cargo is expected to arrive at the destination. Furthermore, the processor(s) 24 are configured to determine desired alternative cargo routes 88 based at least in part on the available alternative cargo routes 84 and the cargo time constraint information 86. For example, the processor(s) 24 may evaluate whether each available alternative cargo route enables the cargo to reach the destination within the provided time constraints. If so, the available alternative cargo route is added to a list of desired alternative cargo routes 88.

The processing system 22 then utilizes the desired alternative cargo routes 88 (e.g., in conjunction with the available seating capacity 56, the expected passenger demand 58, the expected cargo demand 60, and the available cargo capacity 78) in determining the passenger ticket price 64, the cargo price 66, and the fuel quantity 68. For example, in certain embodiments, the processor(s) 24 determine whether rerouting a portion of the cargo enhances the profitability of the flight network. In such embodiments, the processor(s) 24 determine the costs associated with rerouting cargo along one or more of the desired alternative cargo routes 88 (e.g., by selecting route(s) that facilitate transportation of the cargo at the lowest price). The processor(s) 24 and the trajectory predictor 26 then cooperatively determine the increased seating capacity and/or the decreased fuel quantity resulting from rerouting the cargo. If the expected revenue from the passenger ticket sales resulting from the increased seating capacity and/or the expected fuel cost reduction resulting from the decreased fuel quantity exceeds the costs associated with rerouting the cargo, the processing system 22 reduces the available cargo capacity 78 (e.g., with the excess cargo being rerouted), thereby enhancing the profitability of the flight network.

In certain embodiments, the processor(s) 24 include an overbooking management system 90 (e.g., which may be implemented via software, circuitry, etc.). The overbooking management system 90 is configured to reduce overbooking of passengers and/or cargo, thereby further enhancing profitability of the flight network. For example, if the cargo that reaches the aircraft by the departure date/time exceeds the cargo capacity of the aircraft (e.g., due to a higher than expected cargo show-up quantity), the excess cargo (e.g., a portion of the later arriving cargo and/or a portion of the earlier arriving cargo) is rerouted to the destination (e.g., on alternative flights, via ground transportation, etc.). Similarly, if the number of ticket-holding passengers that reach the aircraft by the departure date/time exceeds the seating capacity of the aircraft, the excess passengers (e.g., a portion of the later arriving/booked passengers and/or a portion of the earlier arriving/booked passengers) are rerouted to the destination (e.g., on alternative flights, via ground transportation, etc.). As will be appreciated, costs associated with rerouting passengers and/or cargo may decrease the profitability of the flight network. For example, the increased costs associated with transporting the rerouted cargo and/or the rerouted passengers to the destination, as compared to transporting the cargo and/or the passengers on the flight along the desired route, decreases the profitability of the flight network. In addition, cargo transporters may receive a discount for delays associated with rerouting cargo, and/or passengers may receive discounts, vouchers, and/or other compensation for delays associated with rerouting the passengers. Accordingly, the overbooking management system 90 is configured to adjust the available seating capacity 56 and/or the available cargo capacity 78 to reduce overbooking of passengers and/or cargo, thereby further enhancing the profitability of the flight network.

In certain embodiments, the revenue management system 31 is utilized in conjunction with the processor(s) 24 and the trajectory predictor 26 to determine the passenger ticket price. For example, the revenue management system 31 may be utilized to determine passenger ticket prices based on fare class (e.g., first class, business class, coach, etc.) and/or date of purchase (e.g., ticket prices may increase as the departure date/time of the flight approaches), among other factors. As a result, the passenger ticket price 64 output by the processing system 22 may be a fare class specific price. By way of example, during the iterative process to determine the passenger ticket price described above, the revenue management system 31 may be used to set the passenger ticket prices during each iteration. Accordingly, factors such as date of purchase may be considered in determining the ticket prices. In addition, the revenue management system 31 may output fare class specific ticket prices during each iteration, thereby facilitating accurate determination of the profitability of the flight network.

While passenger ticket price and cargo price for a flight along a desired route are described herein, it should be appreciated that passenger ticket prices and/or cargo prices may be determined for an itinerary path including multiple flights along multiple routes. For example, if a passenger desires to fly from an origin to a destination, the processing system 22 (e.g., including the revenue management system 31, the processor(s) 24, and the trajectory predictor 26) may route the passenger along multiple flights. The processing system 22 may then determine a passenger ticket price for the passenger itinerary path. In addition, if a cargo transporter desires to ship cargo from an origin to a destination, the processing system 22 may route the cargo along multiple flights. The processing system 22 may then determine a cargo price for the cargo itinerary path. By way of example, the processing system 22 may determine a passenger ticket price for each itinerary path, a cargo price for each itinerary path, and a fuel quantity for each flight associated with the passenger and cargo itinerary paths based on the available seating capacity of each flight of each passenger itinerary path, the expected passenger demand for each flight of each passenger itinerary path, the available cargo capacity for each flight of each cargo itinerary path, and the expected cargo demand for each flight of each cargo itinerary path to enhance profitability of the flight network. In certain embodiments, the flight plan, the aircraft type, the expected weather conditions, or a combination thereof, for each flight of each passenger itinerary path and each cargo itinerary path may be utilized in the price determination process.

As previously discussed, the passenger ticket price, the cargo price, and the fuel quantity are determined to enhance profitability of the flight network. Accordingly, it should be appreciated that the selected passenger ticket price and the selected cargo price for each flight may reduce profitability of the flight, but may enhance the profitability of the flight network (e.g., by increasing profitability of other flights within the network). For example, a cargo price may be selected that results in unused cargo capacity of the aircraft (e.g., due to selection of a high cargo price and low cargo demand). Selection of such a cargo price may reduce the profitability of the flight, but may increase the profitability of the flight network (e.g., by providing additional cargo capacity for rerouted cargo that may otherwise be delayed). In addition, a passenger ticket price may be selected that results in overbooking of a flight (e.g., due to selection of a low passenger ticket price and high passenger demand). Selection of such a ticket price may reduce profitability of the flight, but may increase profitability of the flight network (e.g., because the overbooked passengers may be readily rerouted on low capacity flights).

Furthermore, while selecting a passenger ticket price and a cargo price for a single aircraft within the flight network is described herein, it should be appreciated that passenger ticket prices and cargo prices may be selected for each flight within the flight network to enhance profitability of the network. For example, in certain embodiments, the process of determining the passenger ticket price, the cargo price, and the fuel quantity may be performed concurrently or sequentially (e.g., iteratively) for multiple flights (e.g., each of the flights) within the flight network. In such embodiments, data associated with each flight (e.g., available seating capacity, expected passenger demand, expected cargo demand, etc.) may be shared to facilitate determination of passenger ticket prices, cargo prices, and fuel quantities that enhance profitability of the flight network. By way of example, the passenger ticket price for each flight and/or the cargo price for each flight may be iteratively adjusted until a stopping condition is reached (e.g., the profitability of the flight network is enhanced to a desired degree, a variation in the profitability between iterations decreasing below a threshold value, and/or a maximum number of iterations is reached, etc.).

Figure 4:
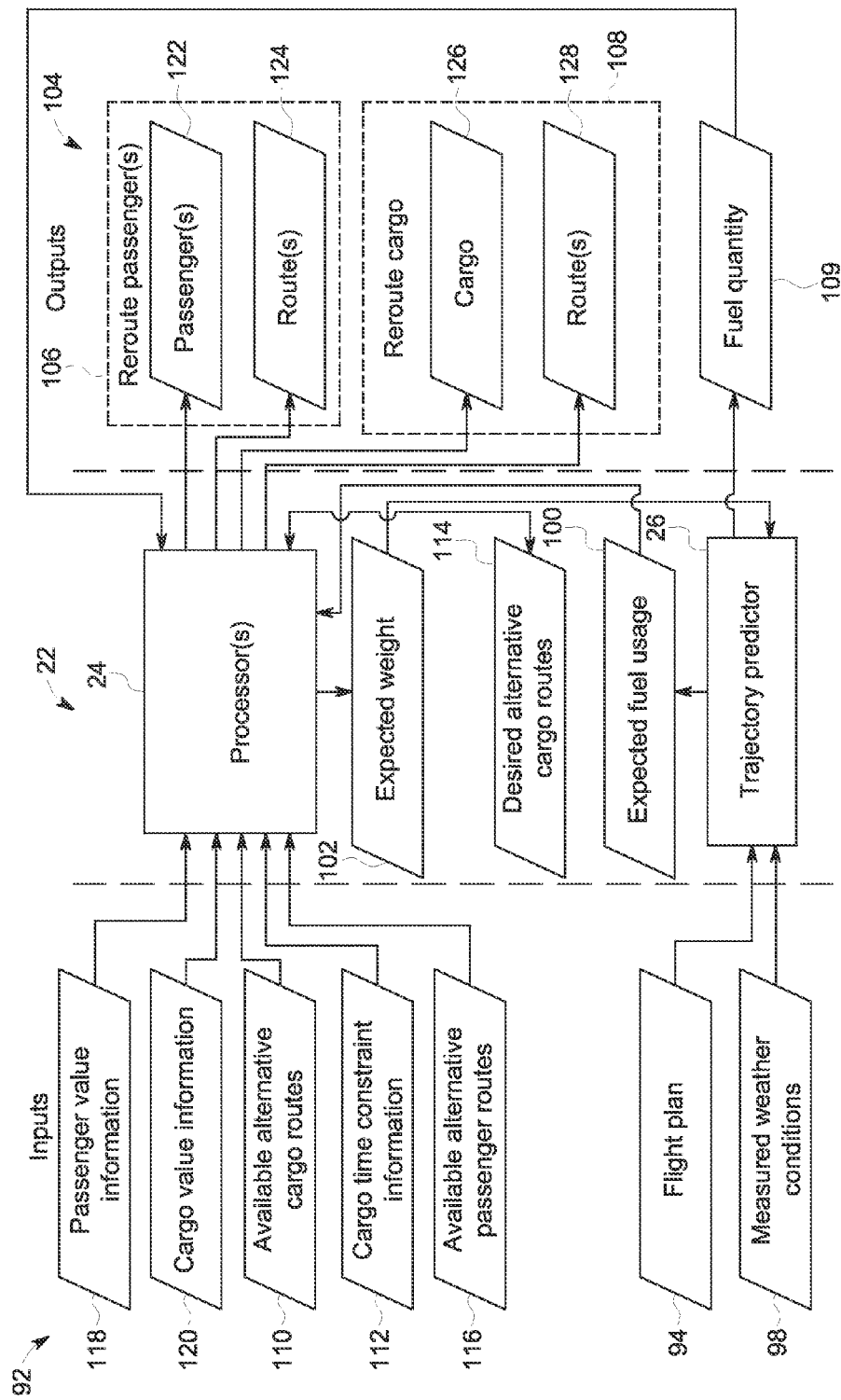
FIG. 4 is a block diagram of an embodiment of a processing system that may be employed within the aircraft operations management system of FIG. 2, in which the processing system is configured to determine whether to reroute passengers and/or cargo during a preflight phase.

FIG. 4 is a block diagram of an embodiment of a processing system 22 that may be employed within the aircraft operations management system of FIG. 2, in which the processing system is configured to determine whether to reroute passengers and/or cargo during a preflight phase. The preflight phase may begin less than 24 hours to about three hours before the flight. For example, the preflight phase may begin less than 24 hours, about 20 hours, about 16 hours, about 12 hours, about eight hours, about five hours, about four hours, or about three hours before the scheduled departure time of the flight. During the preflight phase, the aircraft operations management system determines whether to reroute passengers and/or whether to reroute cargo. As discussed in detail below, rerouting passengers and/or cargo may enhance profitability associated with the flight network.

As illustrated, the processor(s) 24 and the trajectory predictor 26 of the processing system 22 are configured to receive multiple inputs 92 to facilitate determination of whether to reroute passengers and/or cargo. In the illustrated embodiment, the trajectory predictor 26 receives a flight plan 94 and measured weather conditions 98 for the flight along the desired route. The flight plan 94 may be updated from the flight plan 72 received during the planning phase. For example, maneuvers associated with the flight along the desired route may be adjusted based on updated air traffic patterns, runway availability, and/or maintenance schedules, among other parameters. Furthermore, the measured weather conditions 98 may provide more accurate values for wind direction and/or velocity, air temperature, and air pressure, among other parameters than the expected weather conditions 76, which are determined at the beginning of the planning phase.

The trajectory predictor 26 is configured to determine an expected fuel usage 100 based at least in part on the flight plan 94 and the measured weather conditions 98 for the flight along the desired route. In certain embodiments, the trajectory predictor 26 simulates the flight based on the input parameters and determines the expected fuel usage 100 based on the simulation. Due to the updated flight plan 94 and/or the measured weather conditions 98, the expected fuel usage 100 may be greater or less than the expected fuel usage 70 determined during the planning phase. For example, if the measured weather conditions 98 are less favorable than the expected weather conditions 76 (e.g., a strong headwind is measured), the expected fuel usage 100 for the flight along the desired route may be greater than the expected fuel usage 70 determined during the planning phase. In addition, if the updated flight plan 94 includes more maneuvers than the flight plan 72 utilized during the planning phase (e.g., due to updated air traffic patterns, runway availability, maintenance schedules, etc.), the expected fuel usage 100 for the flight along the desired route may be greater than the expected fuel usage 70 determined during the planning phase. Once the expected fuel usage 100 is determined, the processor(s) 24 determine an updated expected weight 102. The updated expected weight 102 includes the basic empty weight of the aircraft, the updated expected fuel load (e.g., which may be determined based on the updated expected fuel usage 100), the expected passenger load (e.g., as determined during the planning phase), the expected crew load, the expected reserved cargo load, and the expected cargo load (e.g., as determined during the planning phase).

Based on the updated expected fuel usage 100 and the updated expected weight 102, the processing system 22 determines whether to reroute passengers and/or whether to reroute cargo to enhance profitability of the flight network. For example, if the updated expected weight 102 exceeds the maximum lifting capacity of the aircraft, the processing system 22 may reroute passengers and/or cargo to reduce the expected weight 102 below the maximum lifting capacity. In addition, the processing system 22 may determine that transporting additional cargo generates more revenue than the losses associated with rerouting passengers and/or with consuming additional fuel. Alternatively, the processing system 22 may determine that transporting additional passengers generates more revenue than the losses associated with rerouting cargo and/or with consuming additional fuel. Furthermore, the processing system 22 may determine that the enhanced profits associated with consuming less fuel exceed the losses associated with rerouting passengers and/or cargo. Once the processing system 22 determines whether to reroute passengers and/or cargo, the processor(s) 24 generate outputs 104 associated with rerouting passenger(s) 106 and with rerouting cargo 108. In addition, the trajectory predictor 26 outputs an updated fuel quantity 109, which is based on the variation in expected weight 102 associated with rerouting passengers and/or cargo.

In certain embodiments, the processing system 22 is configured to receive available alternative cargo routes 110 and cargo time constraint information 112. The available alternative cargo routes 110 may be updated from the available alternative cargo routes 84 received during the planning phase. For example, routes may be added, canceled, and/or modified between the planning phase and the preflight phase based on updates to the flight network (e.g., to enhance profitability), weather conditions, aircraft maintenance schedules, and/or unexpected passenger volume, among other factors. In addition, the cargo time constraint information 112 may be updated from the cargo time constraint information 86 received during the planning phase. For example, the maximum date/time for which the cargo is expected to arrive at the destination may be adjusted based on the requirements of the shipper. The processing system 22 is configured to determine desired alternative cargo routes 114 based at least in part on the updated available alternative cargo routes 110 and the updated cargo time constraint information 112. For example, the processing system 22 may evaluate whether each available alternative cargo route enables the cargo to reach the destination within the provided time constraints. If so, the available alternative cargo route is added to a list of desired alternative cargo routes.

In addition, the processing system 22 is configured to receive available alternative passenger routes 116, passenger value information 118, and cargo value information 120. The available alternative passenger routes 116 may include a list of routes (e.g., direct or indirect routes including one or more flights) from the origin to the destination, and an expected time of arrival for a flight (e.g., the final flight) associated with each route. Furthermore, the passenger value information 118 may include data indicative of an importance of each passenger to an airline associated with the flight along the desired route. For example, a passenger who frequently utilizes the airline for travel (e.g., who is a member of a frequent fliers club, etc.) may have a higher passenger value than a passenger who books a single trip with the airline. In addition, a passenger traveling in first class and/or business class may have a higher passenger value than a passenger traveling in coach. Accordingly, as discussed in detail below, the processing system 22 may reroute lower value passengers, thereby enabling the higher value passengers to remain on the flight (e.g., which may provide the higher value passengers incentive to continue utilizing the airline). The cargo value information 120 may include data indicative of a priority of each cargo item. For example, certain items may have higher priority due to the time-sensitive nature of the cargo (e.g., perishable goods, etc.) and/or the price paid by the shipper (e.g., the shipper may pay higher shipping costs for high priority cargo). Accordingly, as discussed in detail below, the processing system 22 may reroute lower priority cargo, thereby enabling the higher priority cargo to remain on the flight.

As previously discussed, the processor(s) 24 and the trajectory predictor 26 are configured to cooperatively determine whether to reroute passengers and/or cargo during the preflight phase based at least in part on the updated flight plan 94 and/or the measured weather conditions 98. In addition, the processor(s) 24 are configured to determine which passengers to reroute and/or which cargo to reroute based at least in part on expected losses associated with rerouting the passenger and/or with rerouting the cargo. For example, if the updated expected weight 102 exceeds the maximum lifting capacity of the aircraft (e.g., due to increased expected fuel usage 100), the processing system 22 may reroute passengers and/or cargo to reduce the expected weight 102 below the maximum lifting capacity. To determine which passengers and/or cargo to reroute, the processor(s) 24 and the trajectory predictor 26 cooperatively determine the costs associated with rerouting sufficient cargo and/or passengers along one or more of the alternative routes to reduce the expected weight 102 below the maximum lifting capacity of the aircraft. For example, the processor(s) 24 may select cargo having the lowest priority, as provided by the cargo value information 120, thereby reducing or eliminating losses associated with higher priority cargo (e.g., losses due to the expiration of perishable goods). In addition, the processor(s) 24 may select route(s) that facilitate transportation of the cargo at the lowest price. The processor(s) 24 may also select passengers having the lowest value, as provided by the passenger value information 118, thereby reducing losses associated with rerouting higher value passengers (e.g., losses associated with frequent fliers electing to utilize another airline for subsequent flights). Furthermore, the processor(s) 24 may select route(s) that facilitate transportation of the rerouted passengers at the lowest price.

The processor(s) 24 and the trajectory predictor 26 then determine the costs associated with rerouting the selected passengers along the selected passenger route(s) and with rerouting the selected cargo along the selected cargo route(s). As previously discussed, cargo transporters may receive a discount for delays associated with rerouting cargo, and/or passengers may receive discounts, vouchers, and/or other compensation for delays associated with rerouting the passengers. Such discounts/compensation may be incorporated into the costs associated with rerouting the cargo and/or with rerouting the passengers. Once the rerouting costs have been determined, the processor(s) 24 determine which passengers to reroute and/or which cargo to reroute to enhance profitability of the flight network (e.g., by selecting passengers and/or cargo with the lowest rerouting costs). A list of passenger(s) to reroute 122, the new route associated with each passenger 124, a list of cargo to reroute 126, and the new route associated with each cargo item 128 are then output to the user interface, to the storage device, and/or to the network. In addition, the updated fuel quantity 109 (e.g., the reduced fuel quantity resulting from routing the passengers and/or the cargo) is output to the user interface, to the storage device, and/or to the network.

In certain embodiments (e.g., if the updated expected weight 102 does not exceed the maximum lifting capacity of the aircraft), the processor(s) 24 determine whether rerouting a portion of the cargo enhances the profitability of the flight network. In such embodiments, the processor(s) 24 determine the costs associated with rerouting cargo along one or more of the desired alternative cargo routes 114 (e.g., by selecting route(s) that facilitate transportation of the cargo at the lowest price). The processor(s) 24 and the trajectory predictor 26 then cooperatively determine the increased seating capacity and/or the decreased fuel quantity resulting from rerouting the cargo. If the expected revenue from the passenger ticket sales resulting from the increased seating capacity and/or the expected fuel cost reduction resulting from the decreased fuel quantity exceeds the costs associated with rerouting the cargo, the processing system 22 reroutes a portion of the cargo, thereby enhancing the profitability of the flight network.

In addition, in certain embodiments, the processor(s) 24 determine whether rerouting certain passengers enhances the profitability of the flight network. In such embodiments, the processor(s) 24 determine the costs associated with rerouting passengers along one or more of the available alternative passenger routes 116 (e.g., by selecting route(s) that facilitate transportation of passengers at the lowest price). The processor(s) 24 and the trajectory predictor 26 then cooperatively determine the increased cargo capacity and/or the decreased fuel quantity resulting from rerouting the passengers. If the expected revenue from the cargo sales resulting from the increased cargo capacity and/or the expected fuel cost reduction resulting from the decreased fuel quantity exceeds the costs associated with rerouting the passengers, the processing system 22 reroutes certain passengers, thereby enhancing the profitability of the flight network.

Furthermore, in certain embodiments, the processor(s) 24 determine whether reducing the fuel quantity 109 enhances the profitability of the flight network. In such embodiments, the processor(s) 24 determine the costs associated with rerouting cargo along one or more of the desired alternative cargo routes 114. The processor(s) 24 and the trajectory predictor 26 then cooperatively determine the decreased fuel quantity resulting from rerouting the cargo. If the expected fuel cost reduction resulting from the decreased fuel quantity exceeds the costs associated with rerouting the cargo, the processing system 22 reroutes a portion of the cargo, thereby enhancing the profitability of the flight network.

Figure 5:
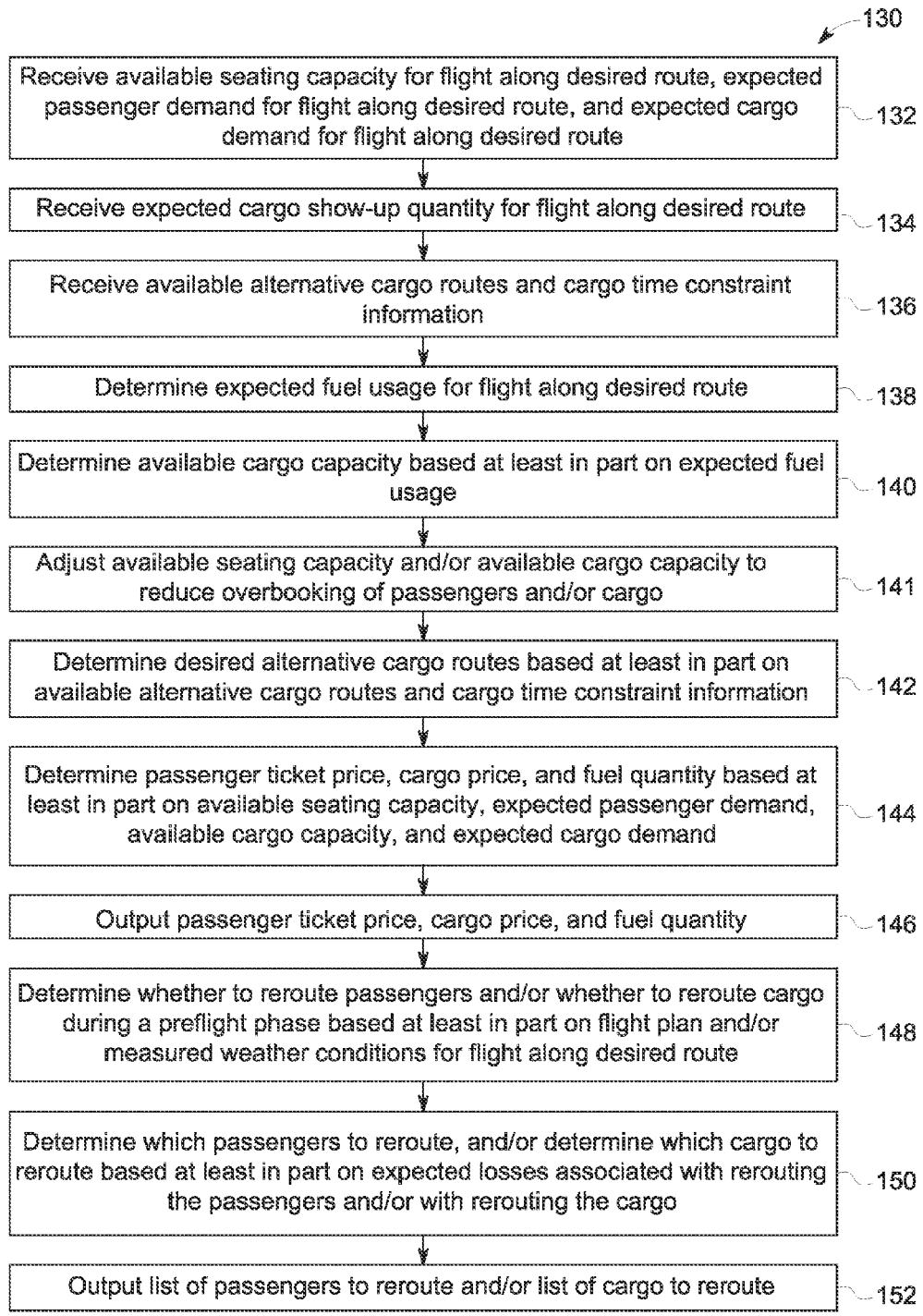
FIG. 5 is a flow diagram of an embodiment of a method for managing aircraft operations.

FIG. 5 is a flow diagram of an embodiment of a method 130 for managing aircraft operations. First, as represented by block 132, available seating capacity of a flight along a desired route, expected passenger demand for the flight along the desired route, and expected cargo demand for the flight along the desired route is received by at least one processor during a planning phase of the flight. The available seating capacity may include a number of unsold seats and/or a class of each unsold seat. The expected passenger demand may include a parameter indicative of the likelihood of passenger ticket sales during the period between the beginning of the planning phase and the beginning of the preflight phase, or a relationship between passenger ticket price and an expected number of passenger ticket sales (e.g., based on a historic distribution of booking profiles by fare class). The expected cargo demand may include a parameter indicative of the likelihood of cargo sales during the period between the beginning of the planning phase and the beginning of the preflight phase, or a relationship between cargo price and an expected quantity of cargo sales (e.g., based on a historic distribution of cargo booking profiles). Furthermore, as previously discussed, the planning phase may begin about one day to about three weeks before the flight.

Next, as represented by block 134, the expected cargo show-up quantity for the flight along the desired route is received by the processor(s). As previously discussed, the expected cargo show-up quantity may include weight and/or volume of the cargo expected to reach the cargo terminal by the departure date/time of the flight. The expected cargo show-up quantity may be based at least in part on the date of the flight, the origin location, and/or the destination location. In addition, available alternative cargo routes and cargo time constraint information is received by the processor(s), as represented by block 136. As previously discussed, the available alternative cargo routes may include a list of routes from the origin to the destination, and an expected time of arrival for a flight associated with each route. In addition, the cargo time constraint information may include a time range for which the cargo is expected to arrive at the destination.

Once the available seating capacity, the expected passenger demand, the expected cargo demand, the expected cargo show-up quantity, the available alternative cargo routes, and the cargo time constraint information are received, an expected fuel usage for the flight along the desired route is determined by the trajectory predictor, as represented by block 138. In certain embodiments, the trajectory predictor substantially corresponds to an onboard flight management system of an aircraft associated with the flight along the desired route. Accordingly, accurate modeling of aircraft performance is provided, thereby facilitating accurate determination of fuel usage. Next, as represented by block 140, the processor(s) determine available cargo capacity based at least in part on the expected fuel usage. For example, in certain embodiments, the processor(s) determine the available cargo capacity by subtracting an expected fuel load (e.g., which may be determined based on the expected fuel usage), an expected passenger load, an expected crew load, and an expected reserved cargo load from the total lifting capacity of the aircraft. In addition, the available cargo capacity may be adjusted based at least in part on the expected cargo show-up quantity. For example, the processor(s) may increase the available cargo capacity by an amount equal to the quantity of cargo that is expected to not reach the cargo terminal by the departure date/time of the flight.

In certain embodiments, as represented by block 141, the available seating capacity and/or the available cargo capacity is adjusted to reduce overbooking of passengers and/or cargo. As previously discussed, reducing overbooking of passengers and/or cargo may enhance the profitability of the flight network by reducing costs associated with rerouting overbooked passengers and/or cargo. Furthermore, in certain embodiments, desired alternative cargo routes are determined based at least in part on the available alternative cargo routes and the cargo time constraint information, as represented by block 142. For example, each available alternative cargo route may be evaluated to determine whether the route enables the cargo to reach the destination within the provided time constraints. If so, the available alternative cargo route is added to a list of the desired alternative cargo routes.

Passenger ticket price, cargo price, and fuel quantity are then cooperatively determined by the processor(s) and the trajectory predictor based at least in part on the available seating capacity, the expected passenger demand, the available cargo capacity, and the expected cargo demand, as represented by block 144. For example, in certain embodiments, the fuel quantity is determined by the trajectory predictor based at least in part on an expected weight of the aircraft. The expected weight of the aircraft, in turn, is determined by the processor(s) based at least in part on the passenger ticket price and the cargo price. As previously discussed, the passenger ticket price is used to determine an expected passenger load (e.g., in conjunction with the available seating capacity, the expected passenger demand, the existing passenger bookings, or a combination thereof). In addition, the cargo price is used to determine an expected cargo load (e.g., in conjunction with the available cargo capacity, the expected cargo demand, and/or the existing cargo commitments). The expected passenger load and the expected cargo load are then added to the basic empty weight, the expected fuel load, the expected crew load, and the expected reserved cargo load, among other weights, to determine the expected weight of the aircraft.

In certain embodiments, the profitability of the flight network is determined based on the expected revenue from the passenger ticket sales (e.g., which may be determined based on an expected number of passenger ticket sales and the passenger ticket price), the expected revenue from the cargo sales (e.g., which may be determined based on expected cargo sales and the cargo price), the fuel costs (e.g., which may be determined based on the expected fuel price and the fuel quantity), and non-fuel operating costs. The passenger ticket price and the cargo price are then iteratively adjusted until a stopping condition is reached (e.g., until the profitability of the flight network is enhanced to a desired degree, a maximum number of iterations is reached, etc.). The passenger ticket price, the cargo price, and the fuel quantity are then output to a user interface, to a storage device, and/or to a network, as represented by block 146.

In certain embodiments, the desired alternative cargo routes (e.g., in conjunction with the available seating capacity, the expected passenger demand, the expected cargo demand, and the available cargo capacity) are utilized in determining the passenger ticket price, the cargo price, and the fuel quantity. In such embodiments, the processor(s) determine whether rerouting a portion of the cargo enhances the profitability of the flight network. First, the processor(s) determine the costs associated with rerouting cargo along one or more of the desired alternative cargo routes (e.g., by selecting route(s) that facilitate transportation of the cargo at the lowest price). Next, the processor(s) and the trajectory predictor cooperatively determine the increased seating capacity and/or the decreased fuel quantity resulting from rerouting the cargo. If the expected revenue from the passenger ticket sales resulting from the increased seating capacity and/or the expected fuel cost reduction resulting from the decreased fuel quantity exceeds the costs associated with rerouting the cargo, the available cargo capacity is reduced (e.g., with the excess cargo being rerouted), thereby enhancing the profitability of the flight network.

In addition, the available alternative passenger routes (e.g., in conjunction with the available seating capacity, the expected passenger demand, the expected cargo demand, and the available cargo capacity) may be utilized in determining the passenger ticket price, the cargo price, and the fuel quantity. In such embodiments, the processor(s) determine whether rerouting certain passengers enhances the profitability of the flight network. First, the processor(s) determine the costs associated with rerouting the passengers along one or more of the available alternative passenger routes (e.g., by selecting route(s) that facilitate transportation of the passengers at the lowest price). Next, the processor(s) and the trajectory predictor cooperatively determine the increased cargo capacity and/or the decreased fuel quantity resulting from rerouting the passengers. If the expected revenue from the cargo sales resulting from the increased cargo capacity and/or the expected fuel cost reduction resulting from the decreased fuel quantity exceeds the costs associated with rerouting the passengers, the available passenger capacity is reduced (e.g., with the excess passengers being rerouted), thereby enhancing the profitability of the flight network.

During the preflight phase (e.g., less than 24 hours before the departure date/time of the flight), a determination of whether to reroute passengers and/or whether to reroute cargo is made based at least in part on the updated flight plan and/or the measured weather conditions for the flight along the desired route, as represented by block 148. Other factors, such as actual demand (e.g., actual passenger demand and/or actual cargo demand) and/or marginal revenue (e.g., associated with passenger ticket sales and/or with cargo sales), may also be utilized, in conjunction with the updated flight plan and/or the measured weather conditions, to determine whether to reroute passengers and/or cargo. For example, in certain embodiments, an updated expected fuel usage is determined by the trajectory predictor based at least in part on the updated flight plan and the measured weather conditions for the flight along the desired route. An updated expected weight is then determined by the processor(s) based on the updated expected fuel usage. To enhance profitability of the flight network, the processor(s) and the trajectory predictor cooperatively determine whether to reroute passengers and/or whether to reroute cargo based at least in part on the updated expected fuel usage and the updated expected weight. Next, as represented by block 150, a determination of which passengers to reroute and/or which cargo to reroute is made based at least in part on expected losses associated with rerouting the passengers and/or with rerouting the cargo. A list of passenger to reroute and/or a list of cargo to reroute is then output to the user interface, to the storage device, and/or to the network, as represented by block 152.

Figure 6:
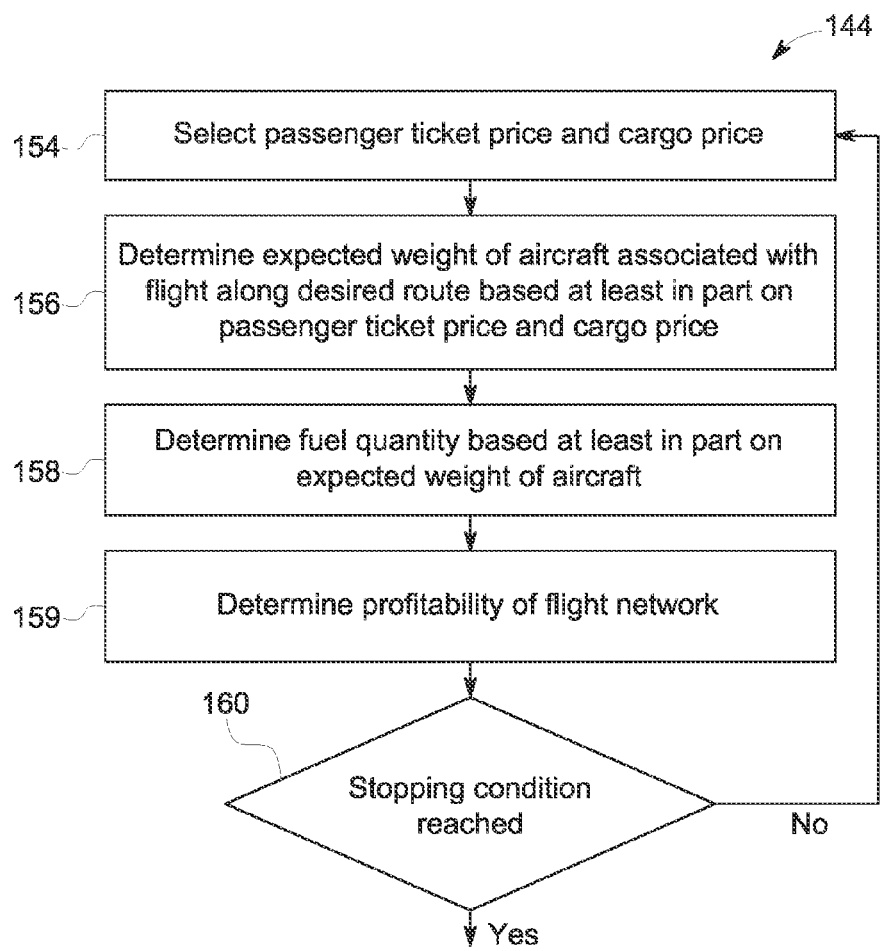
FIG. 6 is a flow diagram of an embodiment of a method for determining passenger ticket price, cargo price, and fuel quantity during a planning phase.

FIG. 6 is a flow diagram of an embodiment of a method 144 for determining passenger ticket price, cargo price, and fuel quantity during a planning phase. First, as represented by block 154, the passenger ticket price and the cargo price are selected. An expected weight of the aircraft associated with the flight along the desired route is then determined based at least in part on the passenger ticket price and the cargo price, as represented by block 156. As previously discussed, the expected weight of the aircraft includes the basic empty weight, the expected fuel load, the expected passenger load, the expected crew load, the expected reserved cargo load, and the expected cargo load. The expected cargo load is based at least in part on the cargo price, the available cargo capacity, and the expected cargo demand. Furthermore, the expected passenger load is based at least in part on the passenger ticket price, the available seating capacity, and the expected passenger demand. Once the expected cargo load and the expected passenger load are determined, the loads are added to the basic empty weight, the expected fuel load, the expected crew load, and the expected reserved cargo load, to determine the expected weight of the aircraft.

Next, as represented by block 158, the fuel quantity is determined based at least in part on the expected weight of the aircraft. For example, the trajectory predictor may simulate the flight along the desired route based at least in part on the expected weight of the aircraft, the flight plan, the aircraft type, and the expected weather conditions, thereby enabling the trajectory predictor to determine the fuel quantity. The profitability of the flight network is then determined, as represented by block 159. As previously discussed, the profitability of the flight network is determined based on the expected revenue from the passenger ticket sales (e.g., which may be determined based on the expected number of passenger ticket sales and the passenger ticket price), the expected revenue from the cargo sales (e.g., which may be determined based on the expected cargo sales and the cargo price), the fuel costs (e.g., which may be determined based on the expected fuel price and the fuel quantity), and the non-fuel operating costs.

If a stopping condition is not reached, as represented by block 160, the passenger ticket price and/or the cargo price is adjusted. As previously discussed, the stopping condition may include the profitability of the flight network being enhanced to a desired degree (e.g., the increase in profitability from the initial profitability is greater than a threshold value), a variation in the profitability between iterations decreasing below a threshold value (e.g., indicating the profitability is approaching a desired value), and/or a maximum number of iterations being reached, among other stopping conditions. By way of example, the passenger ticket price and/or the cargo price may be adjusted (e.g., from an initial value), and the expected weight of the aircraft may be redetermined based on the adjusted passenger ticket price and/or the adjusted cargo price. Once the expected weight of the aircraft is determined (e.g., based on the updated passenger load and the updated cargo load resulting from the adjusted passenger ticket price and/or the adjusted cargo price), the fuel quantity is redetermined based at least in part on the updated expected weight. The profitability of the flight network is then redetermined based on the expected revenue from the passenger ticket sales, the expected revenue from the cargo sales, and the fuel costs. The profitability is compared to the profitability associated with the initial passenger ticket price and the initial cargo price, or with a passenger ticket price/cargo price from a prior iteration. If the profitability is enhanced to a desired degree, the variation in profitability between iterations is reduced below a threshold value, and/or a maximum number of iterations is reached, the passenger ticket price, the cargo price, and the fuel quantity are output to the user interface, to the storage device, and/or to the network. Otherwise, the passenger ticket price and/or the cargo price are adjusted, and the process of determining profitability is repeated.

Figure 7:
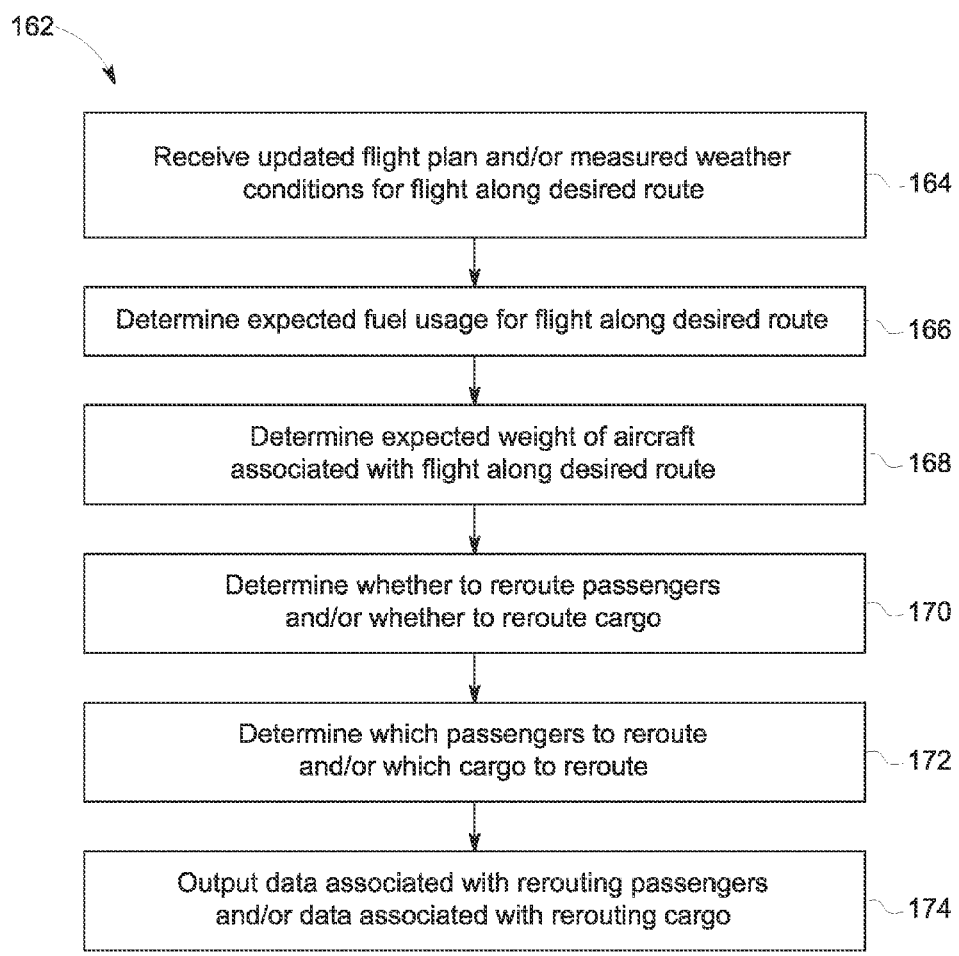
FIG. 7 is a flow diagram of an embodiment of a method for rerouting passengers and/or cargo during a preflight phase.

FIG. 7 is a flow diagram of an embodiment of a method 162 for rerouting passengers and/or cargo during a preflight phase. First, as represented by block 164, an updated flight plan for a flight along a desired route is received by the trajectory predictor. As previously discussed, the updated flight plan is updated during the preflight phase from a flight plan determined during the planning phase, and the flight along the desired route is one of multiple flights within a flight network. Furthermore, measured weather conditions for the flight along the desired route are received by the trajectory predictor. The measured weather conditions are updated during the preflight phase from expected weather conditions determined during the planning phase.

Next, as represented by block 166, an expected fuel usage for the flight along the desired route is determined by the trajectory predictor based at least in part on the updated flight plan and/or the measured weather conditions. An expected weight of an aircraft associated with the flight along the desired route is then determined by the processor(s) based at least in part on the expected fuel usage, as represented by block 168. As represented by block 170, a determination is made whether to reroute passengers and/or whether to reroute cargo during the preflight phase based at least in part on the expected fuel usage and the expected weight to enhance profitability of the flight network. In certain embodiments, a determination of which passengers to reroute and/or which cargo to reroute is made based at least in part on expected losses associated with rerouting the passenger and/or with rerouting the cargo, as represented by block 172. For example, the expected losses associated with rerouting the passengers may be based at least in part on the available alternative passenger routes and the passenger value information, and the expected losses associated with rerouting the cargo may be based at least in part on the available alternative cargo routes, the cargo time constraint information, the cargo value information. Once the rerouting determination is made, the trajectory predictor determines an updated fuel quantity, which is based on the variation in expected weight associated with rerouting passengers and/or cargo.

Next, as represented by block 174, data associated with rerouting the passengers and/or data associated with rerouting the cargo is output to the user interface, to the storage device, to the network, or a combination thereof. In certain embodiments, a list of passenger to reroute and a route associated with each rerouted passenger is output (e.g., to the user interface, to the storage device, to the network, or a combination thereof). In addition, a list of cargo to reroute and a route associated with each rerouted cargo item is output (e.g., to the user interface, to the storage device, to the network, or a combination thereof).

Technical effects include determining a passenger ticket price and a cargo price for at least one flight within a flight network to enhance profitability of the network. For example, an available seating capacity for a flight along a desired route, an expected passenger demand for the flight along the desired route, and an expected cargo demand for the flight along the desired route are received. An expected fuel usage for the flight along the desired route is determined by a trajectory predictor. Available cargo capacity is then determined based at least in part on the expected fuel usage. Next, a passenger ticket price, a cargo price, and a fuel quantity are determined based at least in part on the available seating capacity, the expected passenger demand, the available cargo capacity, and the expected cargo demand to enhance profitability of the flight network. By integrating the determination of passenger ticket price, cargo price, and fuel quantity, network-wide revenue from passenger ticket sales and cargo sales may be increased while fuel costs are reduced. Accordingly, the method described herein may increase profitability of a flight network, as compared to pricing strategies that determine passenger ticket price and cargo price independently and/or do not consider expected fuel usage in determining the cargo price.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system for managing aircraft operations, comprising:
a trajectory predictor configured to determine an expected fuel usage for a flight along a desired route based at least in part on a flight plan, an aircraft type, expected weather conditions, or a combination thereof, for the flight along the desired route, wherein the flight along the desired route is one of a plurality of flights within a flight network; and
a memory operatively coupled to a processor and configured for storing data and instructions that, when executed by the processor, cause the system to perform a method comprising:
determining an available cargo capacity for the flight along the desired route based at least in part on the expected fuel usage;
determining, in cooperation with the trajectory predictor, a passenger ticket price, a cargo price, and a fuel quantity based at least in part on an available seating capacity, an expected
passenger demand, the available cargo capacity, and an expected cargo demand to enhance profitability of the flight network; and outputting the passenger ticket price, the cargo price, and the fuel quantity to a user interface, to a storage device, to a network, or a combination thereof.

2. The system of claim 1, wherein the trajectory predictor substantially corresponds to an onboard flight management system of an aircraft associated with the flight along the desired route.

3. The system of claim 1, wherein the fuel quantity is determined by the trajectory predictor based at least in part on an expected weight of an aircraft associated with the flight along the desired route, and the expected weight is at least partially dependent upon the passenger ticket price and the cargo price.

4. The system of claim 1, wherein the method comprises determining the available cargo capacity based at least in part on an expected cargo show-up quantity.

5. The system of claim 1, wherein the method comprises determining, in cooperation with the trajectory predictor, whether to reroute passengers, whether to reroute cargo, or a combination thereof, during a preflight phase based at least in part on an updated flight plan, measured weather conditions, or a combination thereof, for the flight along the desired route to enhance profitability of the flight network.

6. A computer implemented method for managing aircraft operations, comprising:
receiving an available seating capacity for a flight along a desired route, wherein the flight along the desired route is one of a plurality of flights within a flight network;
receiving an expected passenger demand for the flight along the desired route;
receiving an expected cargo demand for the flight along the desired route;
determining, via a trajectory predictor, an expected fuel usage for the flight along the desired route;
determining, via at least one processor, an available cargo capacity for the flight along the desired route based at least in part on the expected fuel usage;
determining, via the at least one processor and the trajectory predictor, a passenger ticket price, a cargo price, and a fuel quantity based at least in part on the available seating capacity, the expected passenger demand, the available cargo capacity, and the expected cargo demand to enhance profitability of the flight network; and
outputting the passenger ticket price, the cargo price, and the fuel quantity to a user interface, to a storage device, to a network, or a combination thereof.

7. The method of claim 6, wherein the trajectory predictor substantially corresponds to an onboard flight management system of an aircraft associated with the flight along the desired route.

8. The method of claim 6, wherein the fuel quantity is determined by the trajectory predictor based at least in part on an expected weight of an aircraft associated with the flight along the desired route, and the expected weight is at least partially dependent upon the passenger ticket price and the cargo price.

9. The method of claim 6, wherein determining the passenger ticket price, the cargo price, and the fuel quantity, comprises:
selecting the passenger ticket price and the cargo price;
determining, via the at least one processor, an expected weight of an aircraft associated with the flight along the desired route based at least in part on the passenger ticket price and the cargo price;
determining, via the trajectory predictor, the fuel quantity based at least in part on the expected weight of the aircraft; and
iteratively adjusting, via the at least one processor, the passenger ticket price and the cargo price until a stopping condition is reached.

10. The method of claim 6, wherein the trajectory predictor is configured to determine the expected fuel usage based at least in part on a flight plan, an aircraft type, expected weather conditions, or a combination thereof, for the flight along the desired route.

11. The method of claim 6, comprising receiving an expected cargo show-up quantity for the flight along the desired route, wherein determining the available cargo capacity is based at least in part on the expected cargo show-up quantity.

12. The method of claim 6, comprising:
receiving available alternative cargo routes and cargo time constraint information; and
determining, via the at least one processor, desired alternative cargo routes based at least in part on the available alternative cargo routes and the cargo time constraint information;
wherein determining the passenger ticket price, the cargo price, and the fuel quantity is based at least in part on the desired alternative cargo routes.

13. The method of claim 6, comprising adjusting, via the at least one processor, the available seating capacity, the available cargo capacity, or a combination thereof, to reduce overbooking of passengers, to reduce overbooking of cargo, or a combination thereof.

14. The method of claim 6, comprising determining, via the at least one processor and the trajectory predictor, whether to reroute passengers, whether to reroute cargo, or a combination thereof, during a preflight phase based at least in part on a flight plan, measured weather conditions, or a combination thereof, for the flight along the desired route to enhance profitability of the flight network.

15. The method of claim 6, comprising;
determining, via the at least one processor, which passengers to reroute, which cargo to reroute, or a combination thereof, based at least in part on expected losses associated with rerouting the passengers, with rerouting the cargo, or a combination thereof; and
outputting a list of passengers to reroute, a list of cargo to reroute, or a combination thereof, to the user interface, to the storage device, to the network, or a combination thereof.

16. A computer implemented method for managing aircraft operations, comprising:
receiving an updated flight plan for a flight along a desired route, measured weather conditions for the flight along the desired route, or a combination thereof, wherein the updated flight plan is updated during a preflight phase from a flight plan determined during a planning phase, the measured weather conditions are updated during the preflight phase from expected weather conditions determined during the planning phase, and the flight along the desired route is one of a plurality of flights within a flight network;
determining, via a trajectory predictor, an expected fuel usage for the flight along the desired route based at least in part on the updated flight plan, the measured weather conditions, or the combination thereof;
determining, via at least one processor, an expected weight of an aircraft associated with the flight along the desired route based at least in part on the expected fuel usage;
determining, via the at least one processor, whether to reroute passengers, whether to reroute cargo, or a combination thereof, during the preflight phase based at least in part on the expected fuel usage and the expected weight to enhance profitability of the flight network;

determining, via the at least one processor, which passengers to reroute, which cargo to reroute, or a combination thereof, based at least in part on expected losses associated with rerouting the passengers, with rerouting the cargo, or a combination thereof; and outputting data associated with rerouting the passengers, data associated with rerouting the cargo, or a combination thereof, to a user interface, to a storage device, to a network, or a combination thereof.

17. The method of claim 16, wherein the expected losses associated with rerouting the passengers are based at least in part on available alternative passenger routes and passenger value information, and the expected losses associated with rerouting the cargo are based at least in part on available alternative cargo routes, cargo time constraint information, and cargo value information.

18. The method of claim 16, wherein outputting the data associated with rerouting the passengers, the data associated with rerouting the cargo, or the combination thereof, comprises outputting a list of passengers to reroute and a route associated with each rerouted passenger, a list of cargo to reroute and a route associated with each rerouted cargo item, or a combination thereof, to the user interface, to the storage device, to the network, or the combination thereof.

19. The method of claim 16, wherein the trajectory predictor substantially corresponds to an onboard flight management system of the aircraft associated with the flight along the desired route.

* * * * *